United States Patent
Govindarajan et al.

(10) Patent No.: US 12,020,080 B2
(45) Date of Patent: Jun. 25, 2024

(54) AUTOMATED RESOURCE REQUEST MECHANISM FOR HETEROGENEOUS INFRASTRUCTURE USING PROFILING INFORMATION

(71) Applicant: International Business Machines Corporation, Armonk, NY (US)

(72) Inventors: Chander Govindarajan, Bangalore (IN); Sayandeep Sen, Bangalore (IN); Palanivel Andiappan Kodeswaran, Bangalore (IN); Sarang Sangram, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 430 days.

(21) Appl. No.: 17/391,546

(22) Filed: Aug. 2, 2021

(65) Prior Publication Data
US 2023/0030795 A1   Feb. 2, 2023

(51) Int. Cl.
*G06F 9/50* (2006.01)
*G06F 9/445* (2018.01)
*G06N 20/00* (2019.01)

(52) U.S. Cl.
CPC .......... *G06F 9/5072* (2013.01); *G06F 9/4451* (2013.01); *G06F 9/5011* (2013.01); *G06F 9/5077* (2013.01); *G06N 20/00* (2019.01)

(58) Field of Classification Search
None
See application file for complete search history.

(56) References Cited

U.S. PATENT DOCUMENTS 10,120,671 B1 * 11/2018 Li ..................... G06F 9/45545
10,922,463 B1 *  2/2021 Mahajan ............. G06F 30/347
(Continued)

OTHER PUBLICATIONS

Rajput et al., Optimal Resource Management in the Cloud Environment—A Review, International Journal of Converging Technologies & Management, Dec. 3, 2015.
(Continued)

*Primary Examiner* — Adam Lee
(74) *Attorney, Agent, or Firm* — Ryan, Mason & Lewis, LLP

(57) ABSTRACT

Methods, systems, and computer program products for an automated resource request mechanism for heterogeneous infrastructure using profiling information are provided herein. A computer-implemented method includes obtaining resource utilization information, pertaining to multiple system resources, from multiple heterogeneous system infrastructure deployments; automatically learning resource interdependencies for the heterogeneous system infrastructure deployments by processing at least a portion of the resource utilization information using a first set of machine learning techniques; automatically determining performance profiles, with respect to the multiple system resources, for the multiple heterogeneous system infrastructure deployments by processing at least a portion of the resource utilization information and at least a portion of the learned resource interdependencies using a second set of machine learning techniques; predicting resource requests for at least one of the heterogeneous system infrastructure deployments using the determined performance profiles; and performing automated actions based on the resource request predictions.

20 Claims, 7 Drawing Sheets

(56) References Cited

U.S. PATENT DOCUMENTS

| | | |
|---|---|---|
| 2012/0324114 A1 | 12/2012 | Dutta et al. |
| 2016/0043967 A1 | 2/2016 | Jacob et al. |
| 2017/0063615 A1 | 3/2017 | Yang et al. |
| 2017/0094004 A1* | 3/2017 | Barraclough ......... H04L 67/568 |
| 2017/0264493 A1 | 9/2017 | Cencini et al. |
| 2017/0317945 A1 | 11/2017 | Guo et al. |
| 2018/0197234 A1* | 7/2018 | Ghit ....................... G06Q 30/08 |
| 2019/0312946 A1* | 10/2019 | Chefalas ............... H04L 67/561 |
| 2019/0361800 A1* | 11/2019 | Parees ................. G06F 11/3684 |
| 2020/0257968 A1* | 8/2020 | Mitra .................... G06F 9/4881 |
| 2022/0019476 A1* | 1/2022 | Sanchez .............. G06F 16/9024 |
| 2023/0259802 A1* | 8/2023 | Klimov .................. G06N 3/084 |
| | | 706/62 |

OTHER PUBLICATIONS

Rzadca et al., Autopilot: Workload Autoscaling at Google, EuroSys '20, Apr. 27-30, 2020.
Mell et al., The NIST Definition of Cloud Computing, NIST Special Publication 800-145, Sep. 2011.

* cited by examiner

AUTOMATED RESOURCE REQUEST MECHANISM FOR HETEROGENEOUS INFRASTRUCTURE USING PROFILING INFORMATION

BACKGROUND

The present application generally relates to information technology and, more particularly, to resource management. More specifically, in containerized environments, orchestrators (e.g., Kubernetes, etc.) typically only offer resource specification at the container level, also referred to as a high-level resource request interface (HLRRI). However, in many situations (e.g., in dynamic environments), reconfiguration and scalability issues arise. For instance, in connection with heterogenous infrastructure, over which individual machine characteristics may vary significantly, an HLRRI commonly leads to over-provisioning and underutilized resources.

SUMMARY

In one embodiment of the present invention, an automated resource request mechanism for heterogeneous infrastructure using profiling information is provided. An exemplary computer-implemented method can include obtaining resource utilization information, pertaining to multiple system resources, from multiple heterogeneous system infrastructure deployments, and automatically learning one or more resource interdependencies for at least a portion of the multiple heterogeneous system infrastructure deployments by processing at least a portion of the obtained resource utilization information using a first set of one or more machine learning techniques. The method also includes automatically determining one or more performance profiles, with respect to at least a portion of the multiple system resources, for one or more of the multiple heterogeneous system infrastructure deployments by processing at least a portion of the obtained resource utilization information and at least a portion of the one or more learned resource interdependencies using a second set of one or more machine learning techniques. Further, the method additionally includes predicting at least one resource request for at least one of the multiple heterogeneous system infrastructure deployments using the one or more determined performance profiles, and performing one or more automated actions based at least in part on the at least one resource request prediction.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes an automated resource request mechanism for heterogeneous infrastructure using profiling information. Such an embodiment includes determining resource requests for different types of resources (e.g., central processing unit (CPU), memory, network resources, etc.) across different infrastructure deployments (e.g., server CPU generations, CPU vendor, storage types, etc.), and mapping one unit of resource usage on one type of deployment to at least one corresponding unit of resource usage on a different target deployment by collecting extensive profiling information across different layers of the stack.

As detailed in connection with FIG. 1 and further described herein, at least one embodiment includes implementing a fine-grained resource utilization capture mechanism, a resource interdependencies learning module, a performance profile learning module, and an application low-level (LL) resource generalization module (which can, e.g., generalize to any input application without having to relearn a unique model). By way merely of example, high-level can refer, for instance, to features such as two cores of CPU and 3 GB of random-access memory (RAM), while low-level can refer, for instance, to exact CPU architecture and speed (e.g., 2.5 GHz), RAM interconnect speeds, memory access latency, cache sizes, etc.

Such an embodiment can include obtaining and/or processing at least one desired performance service-level objective (SLO) and HLRRI as inputs, and using one or more models (e.g., statistical models, heuristic models, and/or machine learning models including logistic regression models, neural networks, etc.) to predict one or more resources required at the granularity of a low-level resource request interface (LLRRI). Additionally, in such an embodiment, a cluster scheduler uses a LLRRI to strategically place containers into at least one cluster.

Figure 1:
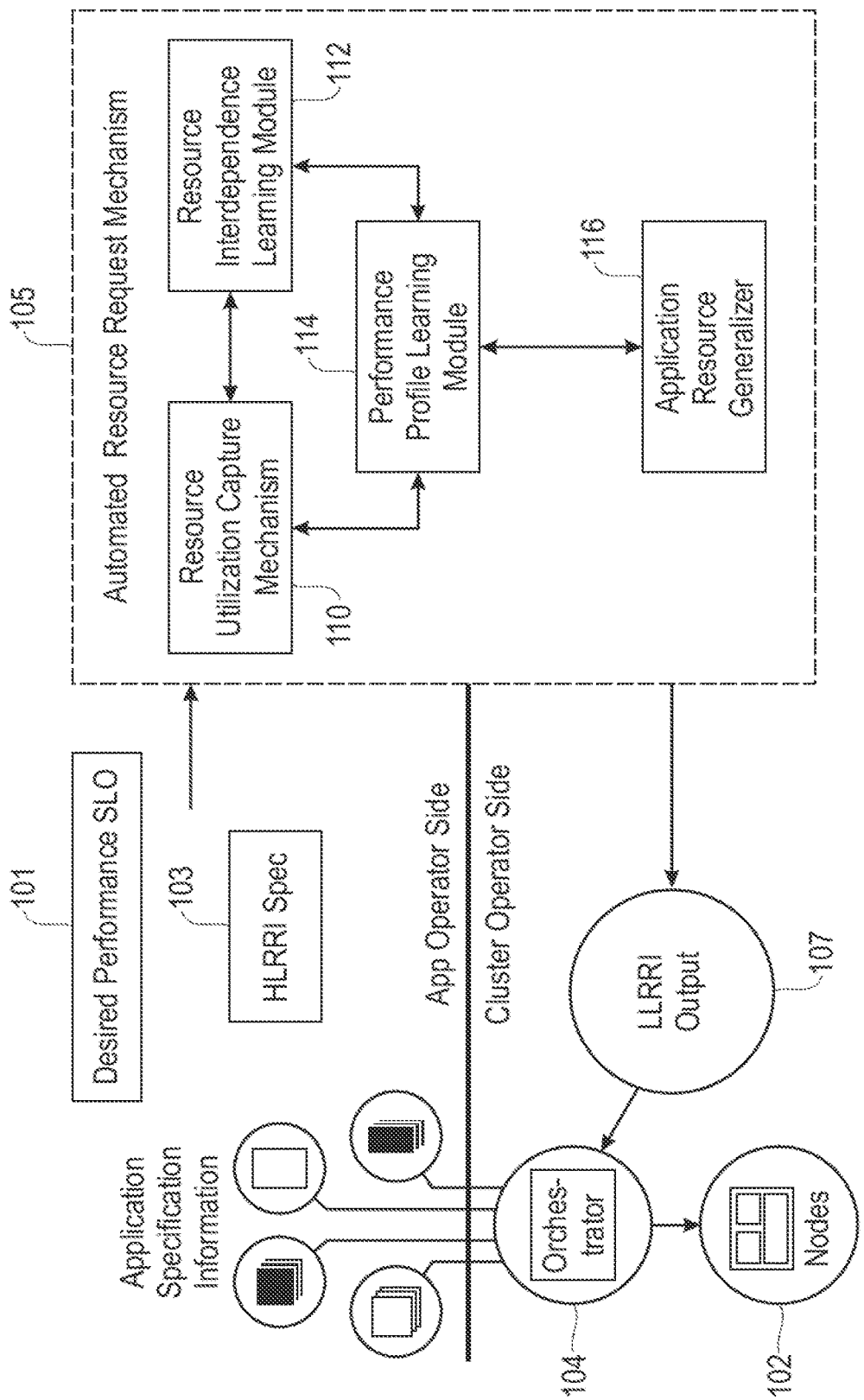
FIG. 1 is a diagram illustrating system architecture, according to an exemplary embodiment of the invention.

FIG. 1 is a diagram illustrating system architecture, according to an embodiment of the invention. By way of illustration, FIG. 1 depicts an automated resource request mechanism 105, which includes a resource utilization capture mechanism 110, a resource interdependence learning module 112, a performance profile learning module 114, and an application resource generalizer 116. As also illustrated, FIG. 1 depicts automated resource request mechanism 105 obtaining and/or processing, from an application operator side, at least one desired performance SLO 101 and HLRRI information 103 as inputs. Based at least in part on such inputs, and as further detailed below, automated resource request mechanism 105 outputs, on the cluster operator side, LLRRI information 107 (e.g., placement hints and/or recommendations) to a cluster scheduler and/or orchestrator 104, which uses such information, along with information from the application operator side (e.g., Kubernetes yamls) to carry out one or more actions with respect to a node 102 (e.g., strategically place the node into at least one cluster, place a container onto a particular node, etc.).

As noted above, FIG. 1 depicts resource utilization capture mechanism 110. In one or more embodiments, the resource utilization capture mechanism 110 facilitates management of performance (e.g., high-level application performance) and low-level resource usage (e.g., using tools to capture lower-level metrics such as exact cache utilization, CPU on-time by process, extended Berkeley packet filter (eBPF), hardware counters, etc.). The resource utilization capture mechanism 110 can also capture hardware characteristics such as, for example, hardware type, cache hierarchy and sizes, hardware attributes such as, for example, clock speed, energy consumption, hyperthreading, etc., and/or application relation to hardware (e.g., CPU/memory placement, cache allocation of target application on the hardware, etc.).

As also depicted in FIG. 1, resource interdependence learning module 112 pertains to resource interdependencies which may be classified into multiple categories such as, for example, static/fixed (e.g., the bandwidth of a point-to-point processor interconnect, etc.), and which may also be allocatable (e.g., cache, memory, etc.). In at least one embodiment, learning resource interdependence(s), using resource interdependence learning module 112 in conjunction with supervised learning techniques (e.g., regression models, neural networks, etc.), can be carried out via the following example embodiment.

For a variety of applications and input ranges, resource interdependence learning module 112 can be run and/or executed in the presence of and/or in conjunction with resource utilization capture mechanism 110. In order to facilitate learning on the available hardware, at least one embodiment includes creating special configurations to run the resource interdependence learning module 112 in accordance with the following parameters. For each allocatable low-level resource, a configuration is created to enable a part of the resource to create an experiment point. For example using a given cache allocation technique, such a configuration can include assigning X % of the resource for use of the resource interdependence learning module 112.

Additionally, such an embodiment includes utilizing a variety of hardware configurations for static low-level resources. For example, different CPU architecture versions can be used in terms of clock speed. Further, in such an embodiment, for every allocatable hardware resource, resource interdependence learning module 112 learns a predictor in terms of one or more other low-level resources for a given performance. If, for example, such a model is trained over a range of applications and/or inputs, with the performance set to 100%, such applications and/or inputs can be generalized. Additionally or alternatively, one or more embodiments can include implementing resource interdependence learning module 112 using one or more heuristics, reinforcement learning techniques, etc.

By way merely of illustration, consider an example operation including an application A with input load I, wherein the hardware (HW) space is modeled as follows: HW=<CPU clock speed, #cores, level 3 (L3) cache (L3C) allotted, double data rate (DDR) bandwidth, DDR latency, quickpath interconnect (QPI) bandwidth, QPI latency, RAM reserved, network interface controller (NIC) bandwidth>. At least one embodiment can include generating points on a variety of hardware configurations and allocated resources such as, for example:

A, I, <2.35 GhZ, 1, 1 MB, 5 Gbps, 130 ns, 5 GBps, 80 ns, 1 GB, 10 GBps>->O1;

A, I, <2.35 GhZ, 2, 1 MB, 5 Gbps, 130 ns, 5 GBps, 80 ns, 1 GB, 10 GBps>->O2;

A, I, <2.35 GhZ, 2, 2 MB, 5 Gbps, 130 ns, 5 GBps, 80 ns, 1 GB, 10 GBps>->O3;

A, I, <3.35 GhZ, 1, 1 MB, 5 Gbps, 130 ns, 5 GBps, 80 ns, 1 GB, 40 GBps>->O4;

A, I, <3.35 GhZ, 2, 1 MB, 5 Gbps, 130 ns, 5 GBps, 80 ns, 1 GB, 10 GBps>->O5;

A, I, <3.35 GhZ, 4, 1 MB, 5 Gbps, 130 ns, 5 GBps, 80 ns, 1 GB, 40 GBps>->O6; etc.

Learning L3 cache dependency on other resources for this application can include the following: $F(A, I, <HW\ space|L3C>, O) \rightarrow L3C$.

Additionally, an aggregate function over input rate I can be determined, for example, by learning a set of F_i with maximum desired O (i.e., O=I), such as the following: $G(A, <HW\ space|L3C>) \rightarrow L3C$. As noted above and herein, the formulation of F, F_i and G are all meant to represent a function learned using different approaches in different environments. For example, in the above illustration, F is learned first, and as F takes I as one of the inputs, F_i is used to represent F wherein I is filled in with i. Additionally, G is a higher-level function obtained by combining all possible F_i, using various statistical and/or machine learning models. Also, an aggregate function over applications of a single category can be determined, for example, by learning G_i, each with a different application A_i, such as the following: $H(<HW\ space|L3C>) \rightarrow L3C$.

Based at least in part on example functions such as noted above, one or more embodiments can include learning, for this example scenario, that when DDR latency goes up, L3C to be allotted goes up, and when CPU clock speed goes up, less L3C can be sufficient for the same performance.

Referring again to FIG. 1, in connection with performance profile learning module 114, for a given application (with load), the module 114 can determine a profile of the application's performance with respect to available resources. In making such a determination, one or more embodiments include running, in connection with the performance profile learning module 114, the application on a variety of hardware configurations, and, for resources that are allocatable, running the application on variety of allocations. Such an embodiment includes generating vectors which represent various micro-resources (e.g., <CPU clock speed, memory bandwidth, cache allotted, etc.>).

By way merely of illustration, an example embodiment includes using supervised learning, such as follows. For a given application, with input load, the hardware space can be represented as a vector, and a predictor learns performance of the application with respect to one or more low-level resources, using, e.g., a linear regression, such as: $F(A, I, <HW\ space>) \rightarrow O$. At run time, for the application A, given: I, the desired input rate, O, the desired output, and <HW static>, the static aspects of the hardware (e.g., clock speed, DDR bandwidth, DDR latency, etc.), at least one embodiment includes solving for <HW allocatable> (e.g., number of cores, L3C, memory, etc.), using, for example, at least one logistic regression. Additionally or alternatively, one or more embodiments can include using a subset of the high-level requested resources as a starting point (e.g., using a user-specified number of cores to determine if such a value is solvable).

Referring again to FIG. 1, application resource generalizer 116 is implemented to predict and/or classify an application's performance. For example, at least one embodiment includes running and/or executing, using application resource generalizer 116, a set of applications known to belong to a single category of intensiveness (e.g., CPU-intensive benchmarks, input-output (IO)-intensive workloads, etc.). Subsequently, the application resource generalizer 116 maps at least one application to one of the pre-existing categories using a corresponding model based thereon. Accordingly, in connection with such an embodiment, a model need not be built for an application; instead, a model may be generalized for a class of applications. Such a model is used, for example, to solve for quantities and/or types of low-level resources on the available machines to meet at least one desired application performance. In at least one embodiment, a user provides a category (e.g., CPU-intensive, network-intensive, etc.) and/or a category can be auto-detecting from the requested HLRRI (e.g., k-cores implies CPU-intensive, an image used is known to be a database, etc.).

Additionally or alternatively, one or more embodiments include using a pre-built resource interdependence model that is trained over a range of applications to translate data points to other hardware. For example, consider a model which has learned that one core of 3.5 Ghz CPU is equivalent to 2×2.5 Ghz CPU cores (with all other parameters remaining the same, trained over multiple applications). By way of illustration, assume that for an application A, a performance profile is learned on 3.5 Ghz core hardware. Accordingly, if application A is to be deployed on a new cluster with only 2.5 Ghz core machines, the learned model is insufficient. Therefore, the performance equation can be solved in terms known (x cores of 3.5 GHz), and at least one embodiment can then include separately translating the solved performance to actual hardware (2× cores of 2.5 GHz).

Figure 2:
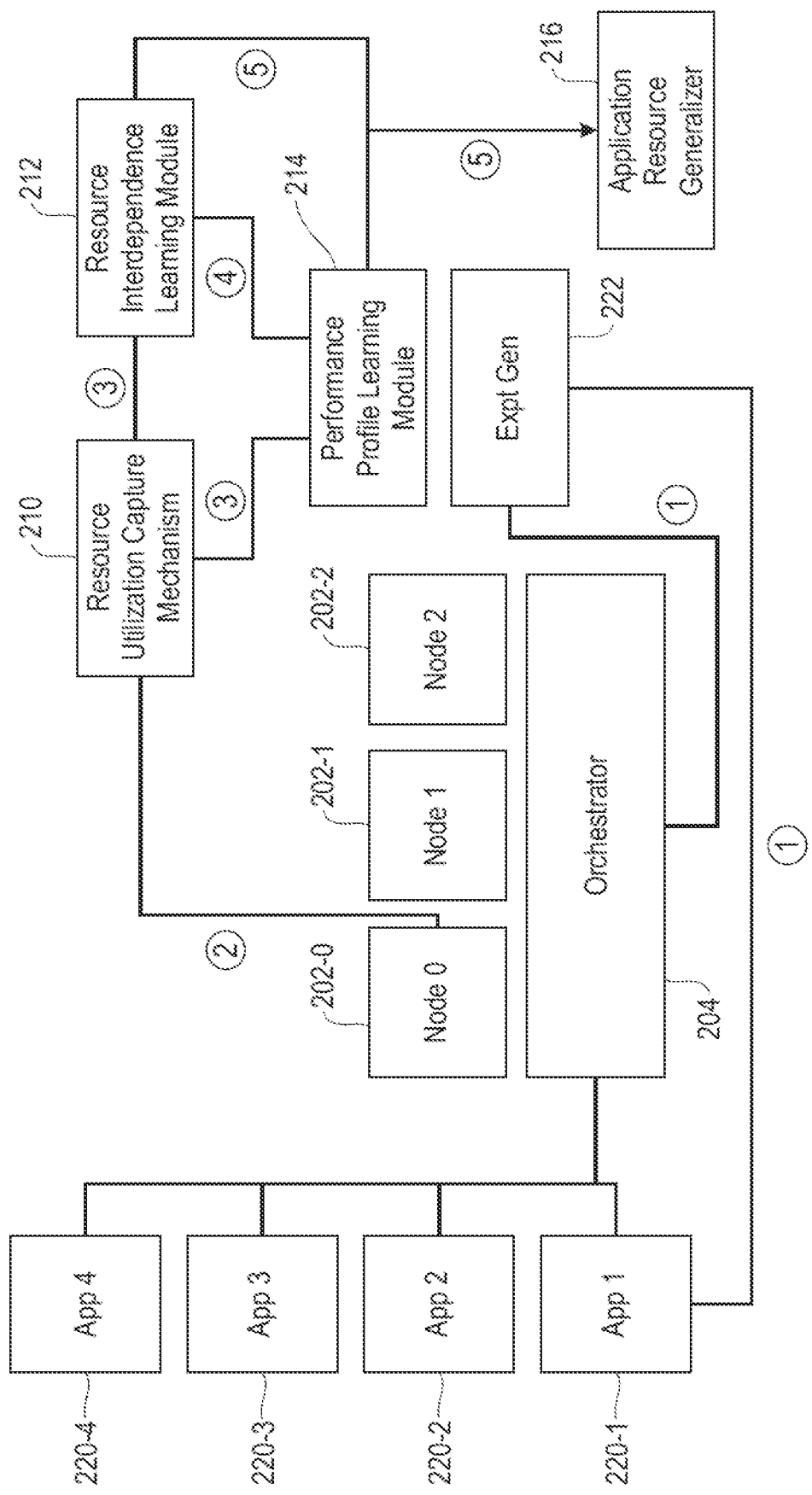
FIG. 2 is a diagram illustrating automated learning utilizing one or more components of an exemplary embodiment of the invention.

FIG. 2 is a diagram illustrating automated learning utilizing one or more components of an exemplary embodiment of the invention. By way of illustration, FIG. 2 depicts applications 220-1, 220-2, 220-3, and 220-4 (collectively referred to herein as applications 220), nodes 202-0, 202-1, and 202-2 (collectively referred to herein as nodes 202), orchestrator 204, experiment generation (expt gen) 222 (which provides the ability to, for example, run a given application at various input rates to identify utilization in terms of low level resources) resource utilization capture mechanism 210, resource interdependence learning module 212, performance profile learning module 214, and application resource generalizer 216.

As illustrated, FIG. 2 also includes multiple numbered steps, which are described as follows. In step 1, application resources (from application 220-1) are fed into the orchestrator 204 and the experiment generator 222. Then, the experiment generator 222 drives an experiment by deploying the application 220-1 and feeding in input at some rate. In step 2, the resource utilization capture mechanism 210 captures the utilization of all types of resources directly from the cluster nodes 202 while the experiment is being run. In step 3: The raw utilization data are fed into the resource interdependence learning module 212 and the performance profile learning module 214. In step 4, insights and/or models learned in the performance profile learning module 214 are also fed into the resource interdependence learning module 212. Also, in step 5, models from modules 212 and 214 are fed into the application resource generalizer 216, which takes in data for different applications and uses techniques to generalize the models over time.

Figure 3:
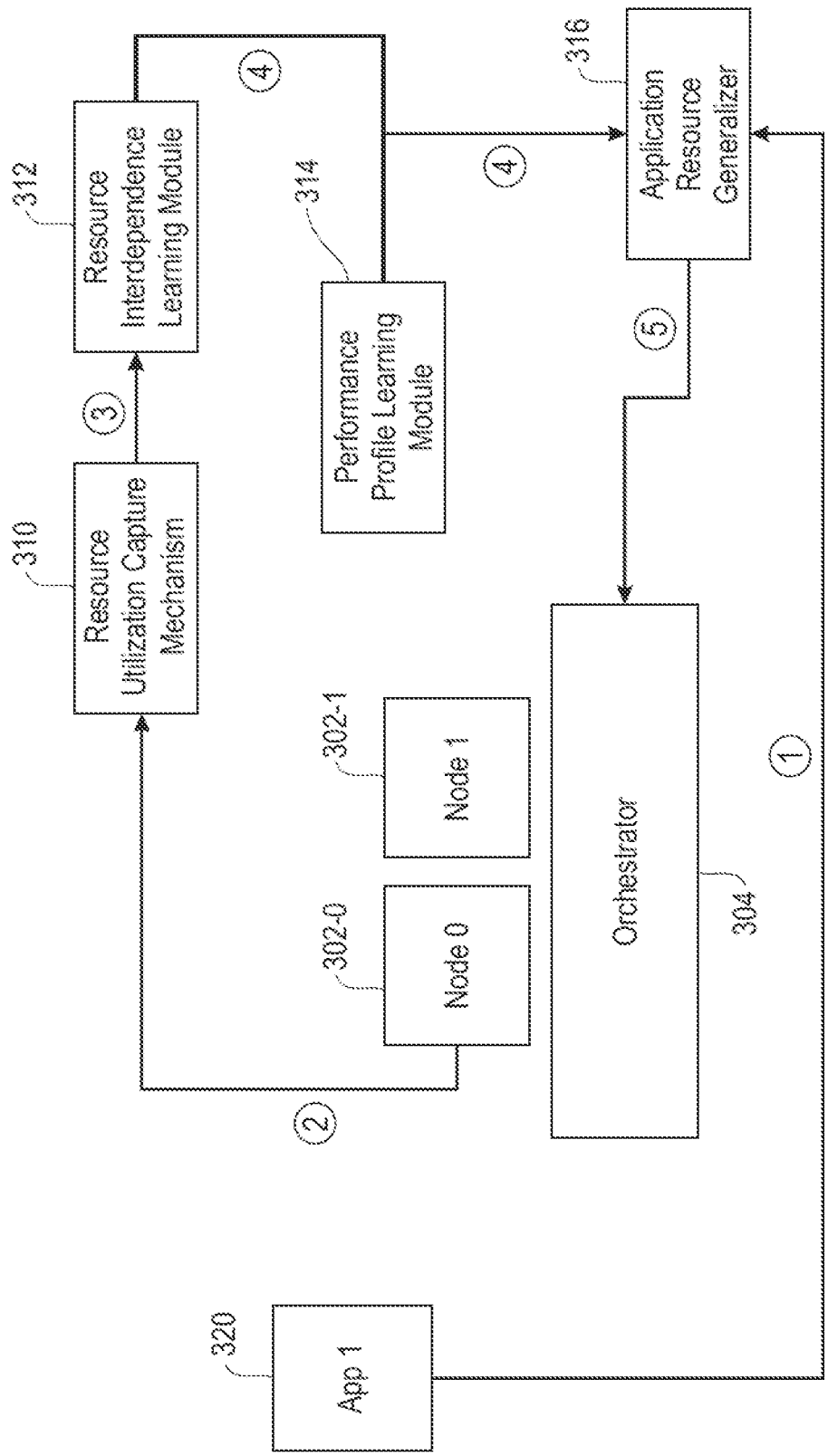
FIG. 3 is a diagram illustrating online operations utilizing one or more components of an exemplary embodiment of the invention.

FIG. 3 is a diagram illustrating online operations utilizing one or more components of an exemplary embodiment of the invention. By way of illustration, FIG. 3 depicts application 320, nodes 302-0 and 302-1 (collectively referred to herein as nodes 302), orchestrator 304, resource utilization capture mechanism 310, resource interdependence learning module 312, performance profile learning module 314, and application resource generalizer 316. As illustrated, FIG. 3 also includes multiple numbered steps, which are described as follows. In step 1, application resources (from application 320) are fed into the application resource generalizer 316 to select the best and/or most suitable model. In step 2, because the cluster is made of a different set of nodes 302, partial information regarding the nodes (e.g., the architecture, available resource types, etc.) are captured by resource utilization capture mechanism 310. In step 3, the captured node resource information is fed into the resource interdependence learning module 312 and in step 4, the resource interdependence learning module 312 uses the built-in models to translate unknown resources to known resources (e.g., from the point of the performance profile module) using one or more mapping models. This information, along with the actual performance profile models, are sent to the application resource generalizer 316 so as to obtain partially filled-in models. Step 5 includes using the selected best model to solve for the schedule and resource(s) required on the available nodes, and this information is sent as requests to the container orchestrator 304, which then fulfils the overall requirements by placing containers and allocating resources.

Figure 4:
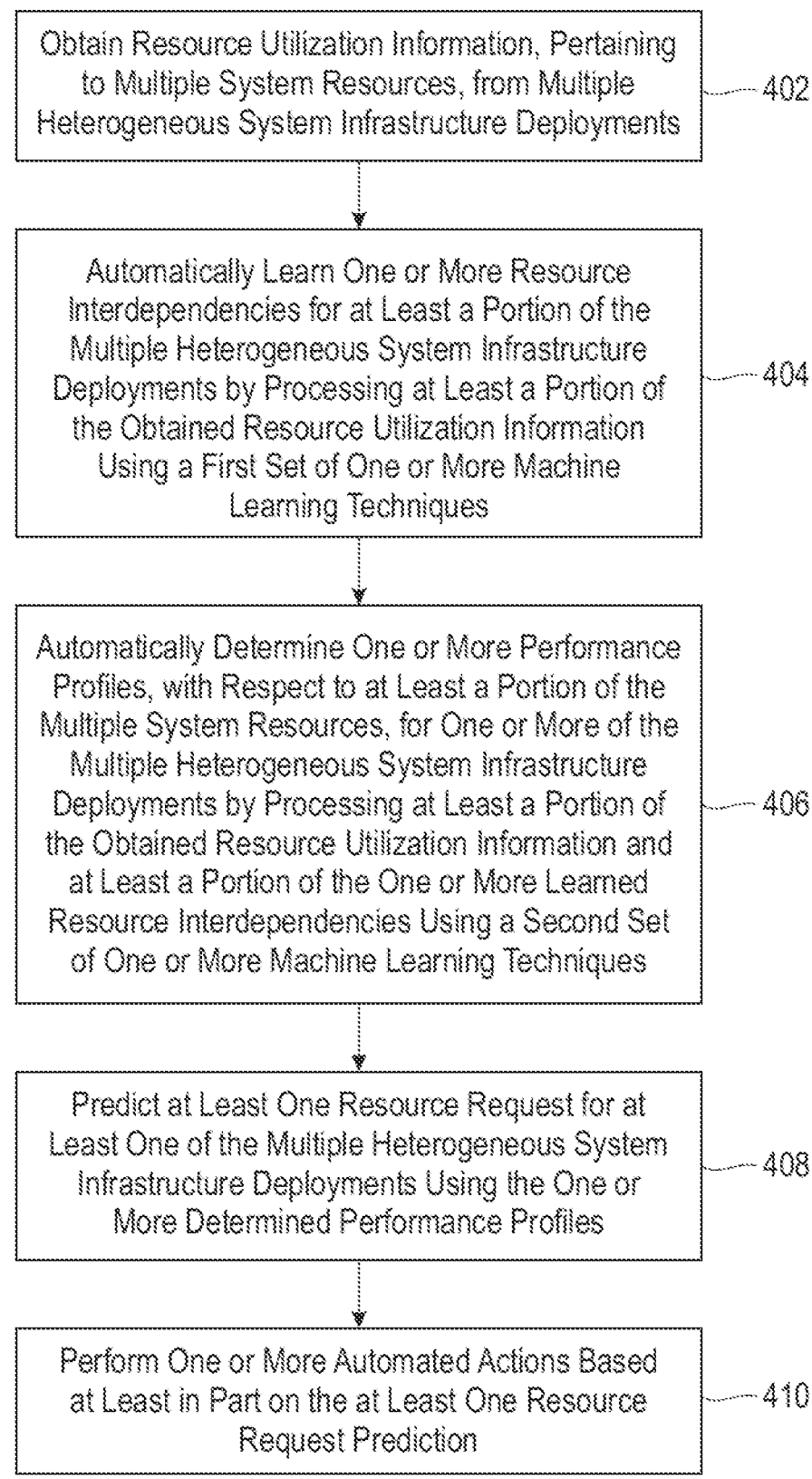
FIG. 4 is a flow diagram illustrating techniques according to an embodiment of the invention.

FIG. 4 is a flow diagram illustrating techniques according to an embodiment of the present invention. Step 402 includes obtaining resource utilization information, pertaining to multiple system resources, from multiple heterogeneous system infrastructure deployments. In one or more embodiments, obtaining resource utilization information includes obtaining performance service-level objective information and high-level resource request interface information pertaining to at least a portion of the multiple heterogeneous system infrastructure deployments. Additionally, the information pertaining to multiple system resources can include information pertaining to central processing unit information, memory information, and network-related resource information, and/or can also include information pertaining to hardware characteristics including one or more of hardware type, cache hierarchy, cache sizes, clock speed, energy consumption, and information pertaining to application relations to hardware.

Step 404 includes automatically learning one or more resource interdependencies for at least a portion of the multiple heterogeneous system infrastructure deployments by processing at least a portion of the obtained resource utilization information using a first set of one or more machine learning techniques. In at least one embodiment, processing at least a portion of the obtained resource utilization information using the first set of one or more machine learning techniques includes processing the at least a portion of the obtained resource utilization information using one or more supervised learning techniques and/or one or more reinforcement learning techniques. Additionally or alternatively, automatically learning one or more resource interdependencies can include automatically learning one or more resource interdependencies pertaining to at least one of one or more static system resources and one or more allocatable system resources.

Step 406 includes automatically determining one or more performance profiles, with respect to at least a portion of the multiple system resources, for one or more of the multiple heterogeneous system infrastructure deployments by processing at least a portion of the obtained resource utilization information and at least a portion of the one or more learned resource interdependencies using a second set of one or more machine learning techniques. In one or more embodiments, processing at least a portion of the obtained resource utilization information and at least a portion of the one or more learned resource interdependencies using the second set of one or more machine learning techniques includes processing at least a portion of the obtained resource utilization information and at least a portion of the one or more learned resource interdependencies using one or more linear regression algorithms, one or more integer linear programming formulations, and/or one or more supervised learning techniques.

Step 408 includes predicting at least one resource request for at least one of the multiple heterogeneous system infrastructure deployments using the one or more determined performance profiles. In one or more embodiments, predicting at least one resource request includes mapping, using the one or more determined performance profiles, at least one of multiple system resources across at least a portion of the multiple heterogeneous system infrastructure deployments.

Step 410 includes performing one or more automated actions based at least in part on the at least one resource request prediction. In at least one embodiment, performing the one or more automated actions comprises training, using the at least one resource request prediction, one or more of (i) at least a portion of the first set of one or more machine learning techniques and (ii) at least a portion of the second set of one or more machine learning techniques. Additionally or alternatively, performing the one or more automated actions can include providing resources to at least one of the multiple heterogeneous system infrastructure deployments in accordance with the at least one resource request prediction.

Also, in one or more embodiments, the multiple heterogeneous system infrastructure deployments include multiple containers, and performing the one or more automated actions can include placing at least a portion of the multiple containers into at least one cluster based at least in part on the at least one resource request prediction. Additionally or alternatively, in at least one embodiment, software implementing the techniques depicted in FIG. 4 can be provided as a service in a cloud environment.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
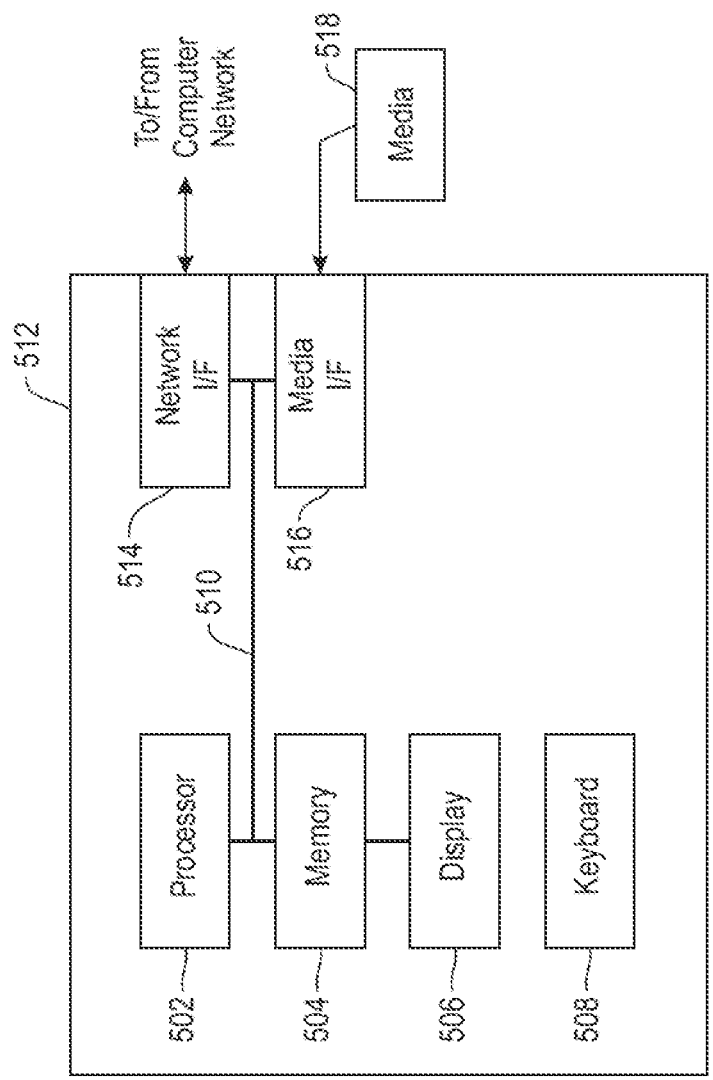
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory RAM, a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
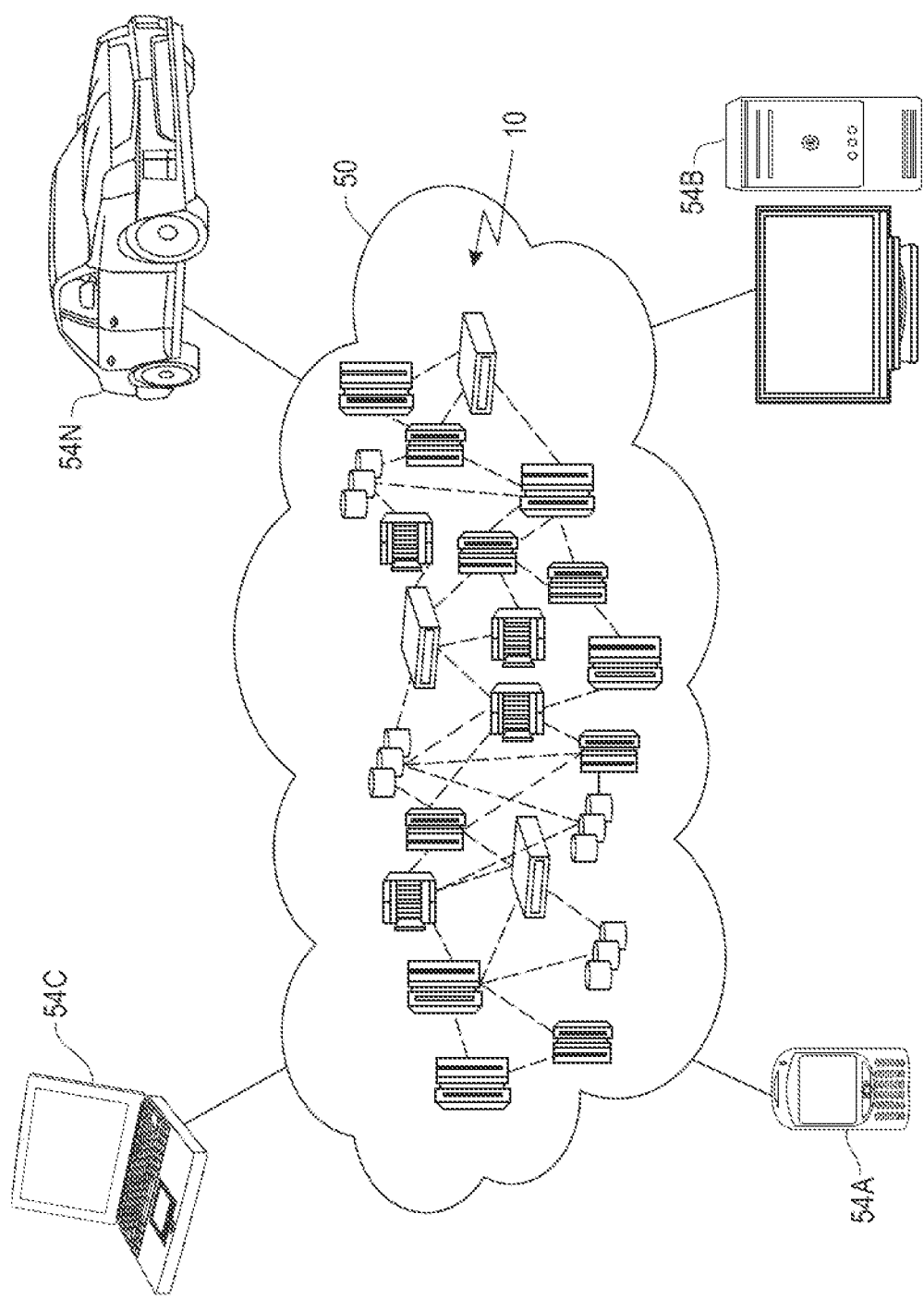
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
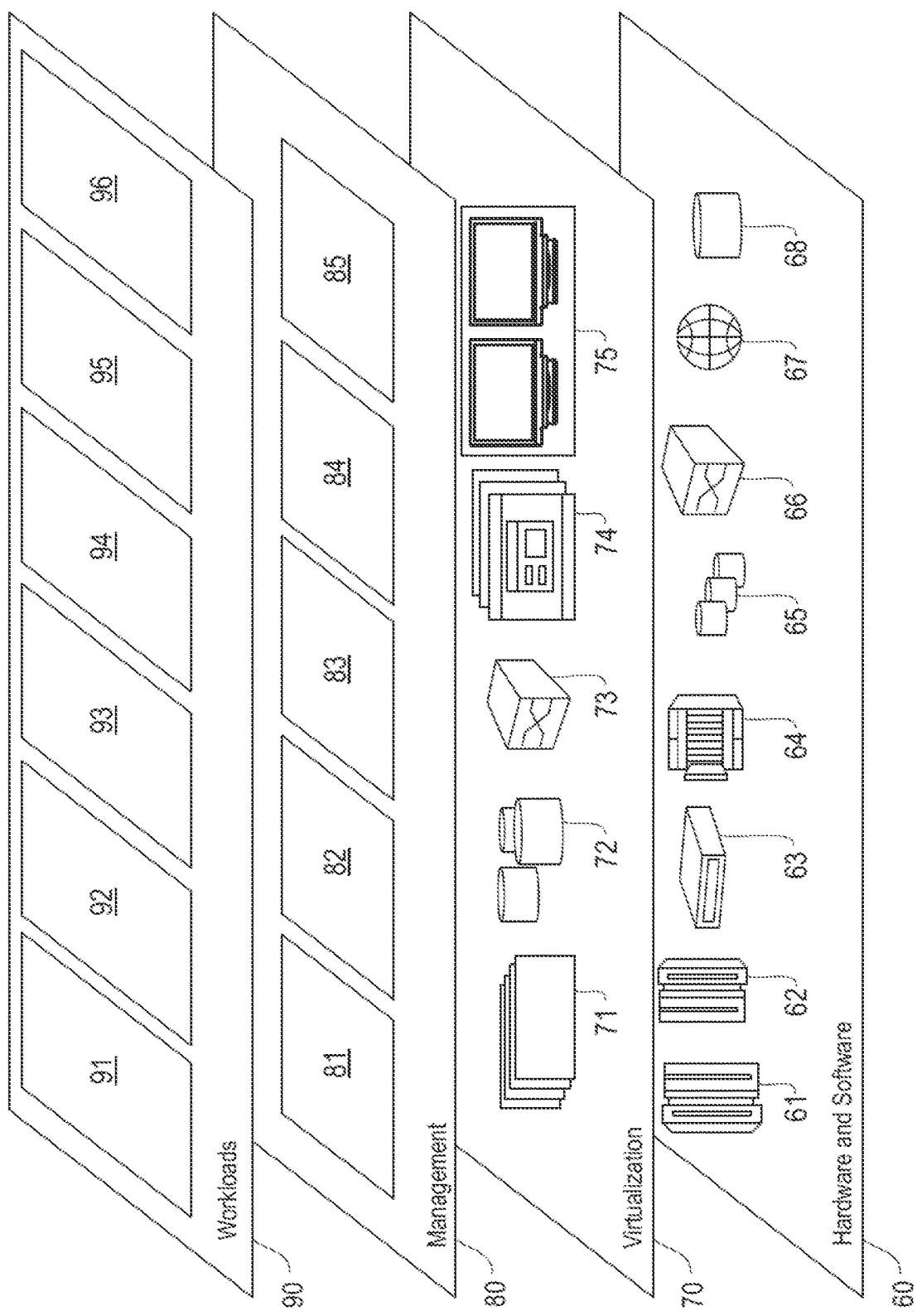
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated resource request mechanism 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, implementing an automated resource request mechanism for heterogeneous infrastructure using profiling information.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining resource utilization information, pertaining to multiple system resources, from multiple heterogeneous system infrastructure deployments; and
    based at least in part on at least one resource request for at least one of the multiple heterogeneous system infrastructure deployments:
        providing resources to the at least one of the multiple heterogeneous system infrastructure deployments; and
        placing at least a portion of multiple containers onto at least one node of at least one cluster of the multiple heterogenous system infrastructure deployments;
        wherein:
            one or more resource interdependencies for at least a portion of the multiple heterogeneous system infrastructure deployments are based at least in part on at least a portion of the obtained resource utilization information and a first set of one or more machine learning techniques;
            one or more performance profiles, with respect to at least a portion of the multiple system resources, for one or more of the multiple heterogeneous system infrastructure deployments are based at least in part on at least a portion of the obtained resource utilization information, at least a portion of the one or more resource interdependencies, and a second set of one or more machine learning techniques, wherein the second set of one or more machine learning techniques is distinct from the first set of one or more machine learning techniques; and the at least one resource request is based at least in part on the one or more performance profiles.

2. The computer-implemented method of claim 1, wherein the first set of one or more machine learning techniques comprises one or more supervised learning techniques.

3. The computer-implemented method of claim 1, wherein the first set of one or more machine learning techniques comprises one or more reinforcement learning techniques.

4. The computer-implemented method of claim 1, wherein the second set of one or more machine learning techniques comprises one or more linear regression algorithms.

5. The computer-implemented method of claim 1, wherein the second set of one or more machine learning techniques comprises one or more integer linear programming formulations.

6. The computer-implemented method of claim 1, wherein the second set of one or more machine learning techniques comprises one or more supervised learning techniques.

7. The computer-implemented method of claim 1, wherein based at least in part on at least one resource request, at least one of multiple system resources is associated with at least a portion of the multiple heterogeneous system infrastructure deployments.

8. The computer-implemented method of claim 1, wherein the one or more resource interdependencies pertain to at least one of one or more static system resources and one or more allocatable system resources.

9. The computer-implemented method of claim 1, wherein obtaining resource utilization information comprises obtaining performance service-level objective information and high-level resource request interface information pertaining to at least a portion of the multiple heterogeneous system infrastructure deployments.

10. The computer-implemented method of claim 1, wherein the resource utilization information pertaining to multiple system resources comprises information pertaining to central processing unit information, memory information, and network-related resource information.

11. The computer-implemented method of claim 1, wherein the resource utilization information pertaining to multiple system resources comprises information pertaining to hardware characteristics comprising one or more of hardware type, cache hierarchy, cache sizes, clock speed, energy consumption, and information pertaining to application relations to hardware.

12. The computer-implemented method of claim 1, wherein software implementing the method is provided as a service in a cloud environment.

13. A computer program product comprising a computer readable storage medium having program instructions embodied therewith, the program instructions executable by a computing device to cause the computing device to:
  obtain resource utilization information, pertaining to multiple system resources, from multiple heterogeneous system infrastructure deployments; and
  based at least in part on at least one resource request for at least one of the multiple heterogeneous system infrastructure deployments:
    provide resources to the at least one of the multiple heterogeneous system infrastructure deployments; and
    place at least a portion of multiple containers onto at least one node of at least one cluster of the multiple heterogenous system infrastructure deployments; wherein:
    one or more resource interdependencies for at least a portion of the multiple heterogeneous system infrastructure deployments are based at least in part on at least a portion of the obtained resource utilization information and a first set of one or more machine learning techniques;
    one or more performance profiles, with respect to at least a portion of the multiple system resources, for one or more of the multiple heterogeneous system infrastructure deployments are based at least in part on at least a portion of the obtained resource utilization information, at least a portion of the one or more resource interdependencies, and a second set of one or more machine learning techniques, wherein the second set of one or more machine learning techniques is distinct from the first set of one or more machine learning techniques; and
    the at least one resource request is based at least in part on the one or more performance profiles.

14. The computer program product of claim 13, wherein the first set of one or more machine learning techniques comprises one or more supervised learning techniques.

15. The computer program product of claim 13, wherein the first set of one or more machine learning techniques comprises one or more reinforcement learning techniques.

16. The computer program product of claim 13, wherein the second set of one or more machine learning techniques comprises one or more linear regression algorithms.

17. A system comprising:
  a memory configured to store program instructions; and
  a processor operatively coupled to the memory to execute the program instructions to:
    obtain resource utilization information, pertaining to multiple system resources, from multiple heterogeneous system infrastructure deployments; and
    based at least in part on at least one resource request for at least one of the multiple heterogeneous system infrastructure deployments:
      provide resources to the at least one of the multiple heterogeneous system infrastructure deployments; and
      place at least a portion of multiple containers onto at least one node of at least one cluster of the multiple heterogenous system infrastructure deployments; wherein:
      one or more resource interdependencies for at least a portion of the multiple heterogeneous system infrastructure deployments are based at least in part on at least a portion of the obtained resource utilization information and a first set of one or more machine learning techniques;
      one or more performance profiles, with respect to at least a portion of the multiple system resources, for one or more of the multiple heterogeneous system infrastructure deployments are based at least in part on at least a portion of the obtained resource utilization information, at least a portion of the one or more resource interdependencies, and a second set of one or more machine learning techniques, wherein the second set of one or more machine learning techniques is distinct from the first set of one or more machine learning techniques; and the at least one resource request is based at least in part on the one or more performance profiles.

18. The system of claim 17, wherein the first set of one or more machine learning techniques comprises one or more supervised learning techniques.

19. The system of claim 17, wherein the first set of one or more machine learning techniques comprises one or more reinforcement learning techniques.

20. The system of claim 17, wherein the second set of one or more machine learning techniques comprises one or more linear regression algorithms.

* * * * *